US006792351B2

(12) United States Patent
Lutter

(10) Patent No.: US 6,792,351 B2
(45) Date of Patent: Sep. 14, 2004

(54) METHOD AND APPARATUS FOR MULTI-VEHICLE COMMUNICATION

(75) Inventor: Robert Pierce Lutter, Tacoma, WA (US)

(73) Assignee: Medius, Inc., Seattle, WA (US)

(*) Notice: Subject to any disclaimer, the term of this patent is extended or adjusted under 35 U.S.C. 154(b) by 0 days.

(21) Appl. No.: 10/143,072

(22) Filed: May 10, 2002

(65) Prior Publication Data

US 2002/0198653 A1 Dec. 26, 2002

Related U.S. Application Data

(63) Continuation of application No. 09/892,333, filed on Jun. 26, 2001, now Pat. No. 6,615,137.

(51) Int. Cl.[7] .......................... G08G 1/09; G01C 21/34

(52) U.S. Cl. .......................................... 701/210; 701/32

(58) Field of Search ................................ 701/209, 210, 701/213, 33, 32; 340/995.13, 995.19; 342/357.06, 357.09, 357.1, 357.13, 357.17

(56) References Cited

U.S. PATENT DOCUMENTS

| | | | | | |
|---|---|---|---|---|---|
| 4,907,159 | A | * | 3/1990 | Mauge et al. | 701/117 |
| 5,907,293 | A | * | 5/1999 | Tognazzini | 340/903 |
| 6,028,537 | A | * | 2/2000 | Suman et al. | 340/988 |
| 6,243,450 | B1 | | 6/2001 | Jansen et al. | |
| 6,292,747 | B1 | * | 9/2001 | Amro et al. | 701/213 |
| 6,298,302 | B2 | * | 10/2001 | Walgers et al. | 701/209 |
| 6,326,903 | B1 | * | 12/2001 | Gross et al. | 340/988 |
| 6,362,748 | B1 | * | 3/2002 | Huang | 340/901 |
| 6,405,132 | B1 | * | 6/2002 | Breed et al. | 701/301 |
| 6,417,782 | B1 | * | 7/2002 | Darnall | 340/902 |

FOREIGN PATENT DOCUMENTS

| | | | |
|---|---|---|---|
| WO | WO96/24229 | | 8/1996 |
| WO | WO99/08436 | | 2/1999 |
| WO | WO99/57662 | | 11/1999 |
| WO | WO99/65183 | | 12/1999 |
| WO | WO 00/40038 | * | 7/2000 |
| WO | WO01/30061 | | 4/2001 |
| WO | WO01/58110 | | 8/2001 |

OTHER PUBLICATIONS

Product description of Raytheon RT Secure, "Embedded Hard Real–Time Secure Operating System", Copyright 2000, pp. 1–2.

Product description of Raytheon RT Secure, Copyright 2001, pp. 1–2.

Product description of Raytheon RT Secure, "Development Environment", Copyright 2001, pp. 1–2.

Product description of Raytheon Electronic Systems (ES), Copyright 2002, pp. 1–2.

H. Chung, L. Ojeda, and J. Borenstein, "Sensor Fusion for Mobile Robot Dead–reckoning with a Precision–calibrated Fiber Optic Gyroscope", 2001 IEEE International Conference on Robotics and Automation, Seoul, Korea, May 21–26, pp. 1–6.

(List continued on next page.)

*Primary Examiner*—Michael J. Zanelli
(74) *Attorney, Agent, or Firm*—Marger Johnson & McCollom, P.C.

(57) ABSTRACT

A message containing a message identifier is received in a vehicle. The message identifier is compared with information associated with the vehicle. If message identifier and the vehicle information correspond in some manner, the message is reported to a vehicle operator and may be relayed to other vehicles.

10 Claims, 7 Drawing Sheets

OTHER PUBLICATIONS

A. Das, R. Fierro, V. Kumar, J. Ostrowski, J. Spletzer, and C. Taylor, "A Framework for Vision Based Formation Control", IEEE Transactions on Robotics and Automation, vol. XX, No. Y, 2001, pp. 1–13.

J. Takezaki, N. Ueki, T. Minowa, H. Kondoh, "Support System for Safe Driving—A Step Toward ITS Autonomous Driving –", Hitachi Review, vol. 49, No. 3, 2000, pp. 1–8.

S.G. Goodridge, "Multimedial Sensor Fusion for Intelligent Camera Control and Human–Computer Interaction", Dissertation submitted to the Graduate Faculty of North Carolina State University in partial fulfillment of the requirements for the degree of Doctor of Philosophy in Electrical Engineering, Raleigh, NC, 1997, pp. 1–5.

M. Chantler, G. Russel, and R. Dunbar, "Probabilistic Sensor Fusion for Reliable Workspace Sensing", pp. 1–14, no date.

ISIS Project: Sensor Fusion, Linkoping University Division of Automatic Control and Communication Systems in cooperation with SAAB (Dynamics and Aircraft), 18 pages, no date.

Hitachi Automated Highway System (AHS), Automotive Products, Hitachi, Ltd., Copyright 1994–2002, 8 pages.

Vehicle Dynamics Lab, University of California, Berkeley, funded by BMW, current members: D. Caveney and B. Feldman, "Adaptive Cruise Control", 17 pages, no date.

Counterair: The Cutting Edge, Ch. 2 "The Evolutionary Trajectory The Fighter Pilot–Here to Stay?" AF2025 v3c8–2, Dec. 1996.

Counterair: The Cutting Edge, Ch. 4 "the Virtual trajectory Air Superiority without an "Air" Force?" AF2025 v3c8–4, Dec. 1996, pp. 1–12.

TNO FEL Annual Review 1998: Quality works, 16 pages.

Boeing News Release, "Boeing Demonstrates JSF Avionics Multi–Sensor Fusion", Seattle, WA, May 9, 2000, pp. 1–2.

Boeing Statement, "Chairman and CEO Phil Condit on the JSF Decision", Washington, D.C., Oct. 26, 2001, pp. 1–2.

Ada 95 Transition Support—Lessons Learned, Sections 3, 4, and 5, CACI, Inc. –Federal, Nov. 15, 1996, 14 pages.

Joint Strike Fighter Terrain Database, ets–news.com "Simulator Solutions" 2002, 3 pages.

MSRC Redacted Proposal, 3.0 Architecture Development, pp. 1–43.

Powerpoint Presentation by Robert Allen—Boeing Phantom Works entitled "Real–Time Embedded Avionics System Security and COTS Operating Systems", Open Group Real–Time Forum, Jul. 18, 2001, 16 pages.

Green Hills Software, Inc., "The AdaMULTI 2000 Integrated Development Environment", Copyright 2002, 7 pages.

Luttge, Karsten; "E–Charging API: Outsource Charging to a Payment Service Provider"; IEEE: 2001 (pp. 216–222).

* cited by examiner

METHOD AND APPARATUS FOR MULTI-VEHICLE COMMUNICATION

RELATED APPLICATION DATA

This application is a continuation-in-part of U.S. patent application, Ser. No. 09/892,333, filed Jun. 26, 2001, now U.S. Pat. No. 6,615,137 entitled: METHOD AND APPARATUS FOR TRANSFERRING INFORMATION BETWEEN VEHICLES.

BACKGROUND

Information needs to be transferred between different vehicles. However, there may not be a communication infrastructure available in certain geographic areas for transmitting information between vehicles. For example, a vehicle traveling through the badlands of South Dakota may be outside of any cellular communication coverage. Even if there were wireless cellular or satellite communication coverage in these geographic regions, each vehicle would have to pay a monthly service fee for the cellular or satellite communication service.

Digital maps are used by vehicles to help navigate to desired locations. The problem is that these maps may not give the best route for arriving at a desired location. For example, there may be traffic accidents or road construction along the route specified in the digital map.

The present invention addresses this and other problems associated with the prior art.

SUMMARY OF THE INVENTION

A massage containing a message identifier is received in a vehicle. The message identifier is compared with information associated with the vehicle. If message identifier and the vehicle information correspond in some manner, the message is reported to a vehicle operator and may be relayed to other vehicles.

The present invention addresses this and other problems associated with the prior art.

DETAILED DESCRIPTION

Figure 1:
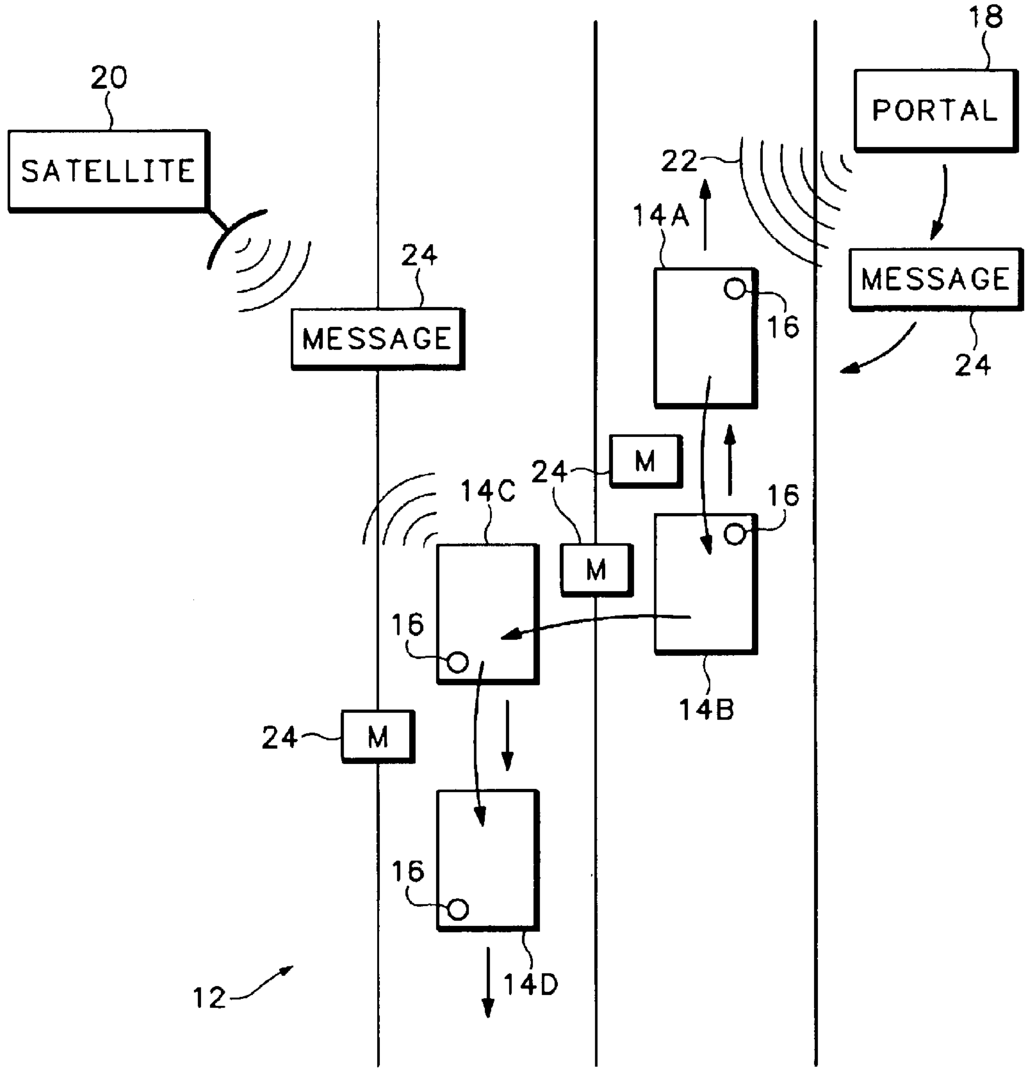
FIG. 1 is a diagram showing a multi-vehicle communication system.

FIG. 1 shows multiple vehicles 14A–14D that are traveling along a roadway 12. Vehicles 14A and 14B are traveling in a northbound lane of traffic and vehicles 14C and 14D are traveling along a southbound lane of traffic. A portal 18 transmits messages to any one of the vehicles 14A–14D that happens to be within a reception range 22.

In this example, vehicle 14A is within range for receiving message (M) 24 transmitted by portal 18. Vehicle 14A receives the message 24 and then possibly relays the message to other vehicles 14B–14D. The message 24 continues to be relayed by vehicles receiving the message 24. This allows message 24 to be propagated directly point-to-point to multiple vehicles along roadway 12 without having to use a cellular or satellite communication infrastructure.

The portal 18 can be any communication system that transmits messages to vehicles 14A–14D. In one example, the portal 18 includes a computer system and wireless transmitter at a car dealership or vehicle service station to send out recall messages or other messages associated with certain vehicles. In another example, the portal 18 is a computer and transmitter at a state or federal transportation agency that sends road condition messages to vehicles 14A–14D. In yet another example, the portal 18 may be a satellite transmitter 20. The portal 18 may be associated with any organization and can be located anywhere information needs to be transmitted to vehicles.

The portal 18 may be coupled through the Internet to a server that initiates the transmission of message 24 from one or more portals 18 at the same time. In the vehicle dealership example, a central server (not shown) may send a recall notice through the Internet to servers located at different car dealerships. Transmitters at the car dealerships then transmit the recall notice wirelessly in message 24 to any vehicles 14A–12D that can receive the transmission. The vehicles receiving the message 24 then spread the message 24 to other vehicles.

Figure 2:
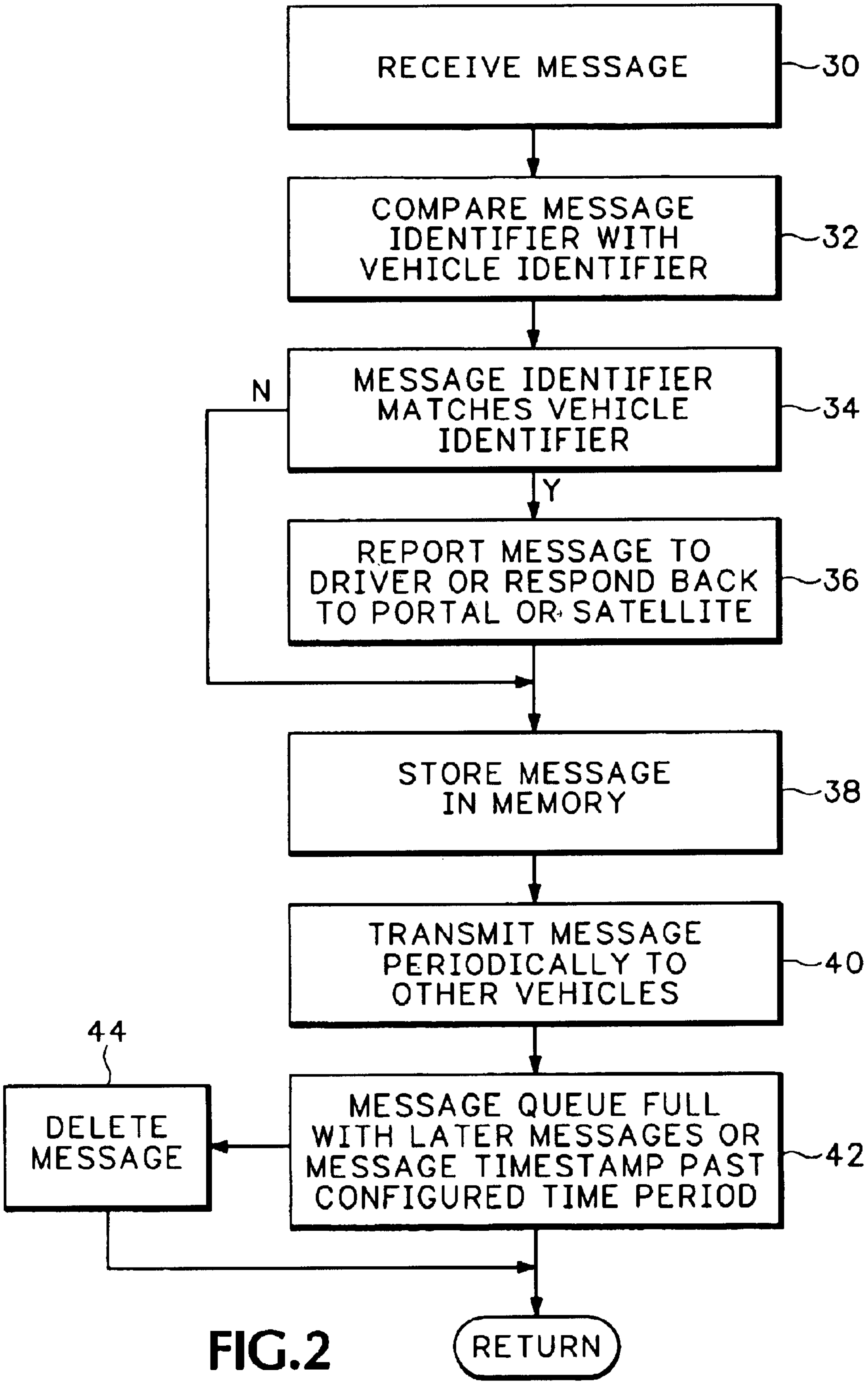
FIG. 2 is a flow diagram showing how messages are relayed in the communication system shown in FIG. 1.

FIG. 2 shows in more detail how the messages 24 are relayed between vehicles 14A–14D. A vehicle receives a message from a portal or another vehicle in block 30. In the car dealership example described above, the message may include a Vehicle Identification Number (VIN number) that identifies specific vehicles associated with the message. However, any vehicle identifier or user identifier can be used. A processor (see FIG. 4) compares a stored vehicle identifier with the identifier contained in the received message in block 32.

If the message identifier matches the vehicle identifier, the message is reported to a vehicle operator or a reply message is sent back in block 36. The message could be reported to a vehicle operator by displaying the message on a display screen located somewhere on the vehicle dashboard. If the message is associated with some emergency condition, a warning light or audible warning annunciator may be activated in block 36. If the message identifier does not match some stored identifier associated with the vehicle, the message is either discarded or stored in a message buffer in block 38.

The vehicle processor periodically retransmits any stored messages to other vehicles in block 40. When the message buffer becomes fall or a timestamp associated with the message exceeds some preconfigured time period, then the message is automatically deleted from the message buffer in block 44. This same process is performed in a similar manner in other vehicles.

Figure 3:
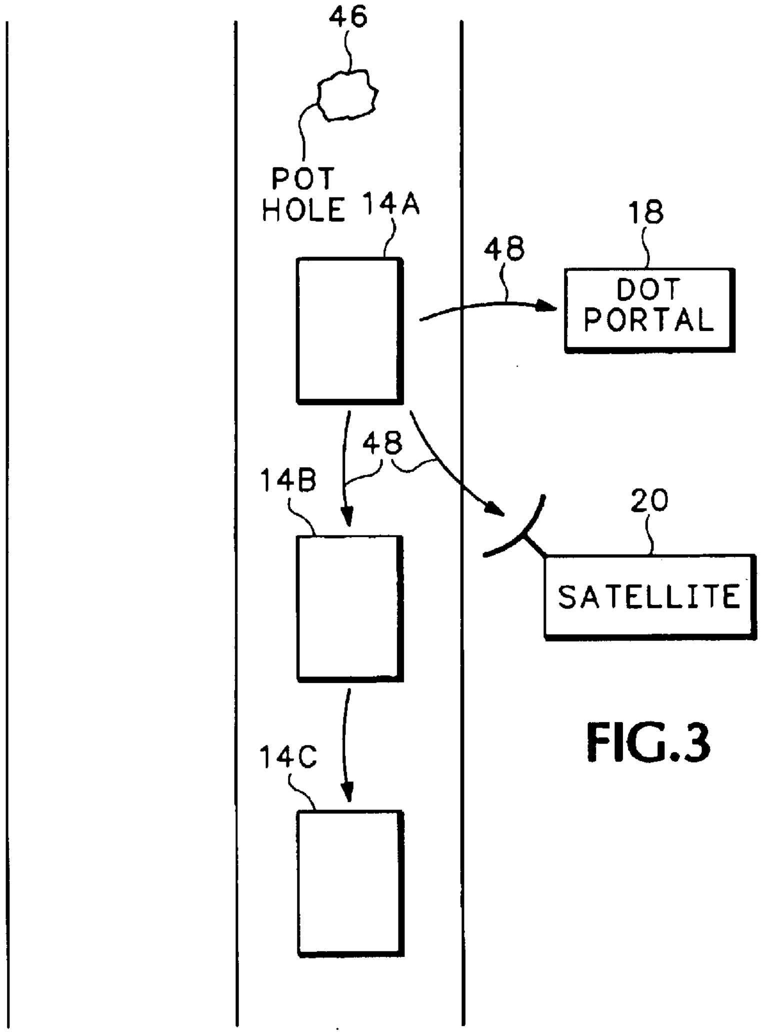
FIG. 3 is a diagram showing how road condition information is relayed to different vehicles.

FIG. 3 shows another example where a message is initiated by a vehicle 14A and then sent to other vehicles 14B and 14C and may also be sent to the portal 18 or through a satellite 20 to a message center. The vehicle 14A may have on-board sensors that detect a specific road condition 46. For example, an infra-red sensor may identify an icy road condition. In another example, a vibration sensor may identify a pothole or a speed sensor may identify a traffic stoppage condition.

A message 48 contains information regarding the road condition. The message 48 also contains a location identifier identifying where the road condition is located. The vehicle 14A broadcasts the message 48 to any vehicle or portal within the same vicinity. For example, the message 48 may be received by a Department of Transportation (DOT) portal 18 and also received by a following vehicle 14B. The DOT portal 18 can send maintenance or emergency personnel to the location identified in the message 48. Vehicle 14B may use the message 48 to provide a warning to the vehicle operator and may also relay the message 48 to other portals or other vehicles, such as vehicle 14C.

Processors in the vehicles receiving the message may compare the location identifier in the message with a current position and direction of the vehicle receiving the message. If the vehicle direction and location do not appear likely to convergence with the road condition identified in the message 48, then message 48 may be discarded. For example, if the vehicle receiving the message 48 has already passed the road condition 46, then the message is discarded.

If the direction and location of the vehicle receiving the message 48 appears to be on a collision course with the location of road condition 46, then consists of message 48 may be displayed or a warning signal annunciated to the vehicle operator. For example, a message may be output on a display screen on the vehicle dashboard indicating the type of road condition 46 and the location or distance to the road condition 46.

Figure 4:
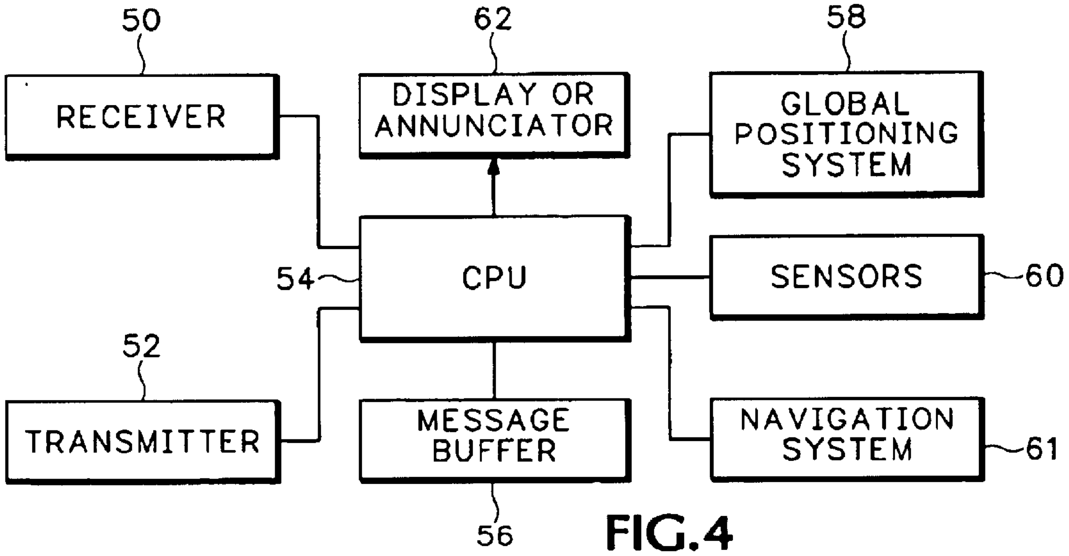
FIG. 4 is a block diagram of a communication controller located in a vehicle.

FIG. 4 shows some of the different functional elements in a vehicle used for relaying messages point-to-point between different vehicles. A wireless receiver 50 receives messages transmitted from portals and other vehicles. A wireless transmitter 52 is used to transmit and relay messages to portals and other vehicles. Any frequency can be used for modulating the messages. For example, the messages can be sent and received on a citizen band frequency or other frequencies used for message communications. In one implementation, the receiver 50 and transmitter 52 also receive and transmit messages over a frequency used for satellite communications.

A message buffer 56 stores messages either generated locally by a Central Processing Unit (CPU) 54 or messages received over receiver 50. A global positioning system 58 is used to identify a current location of the vehicle. Sensors 60 are used for identifying road conditions. The sensor data is converted into messages and transmitted over transmitter 52. A navigation system 61 contains electronic maps for geographic areas where the vehicle is traveling and generates routes based on selected destination points. A display and/or enunciator device 62 is used for notifying a vehicle operator of relevant road conditions identified in received messages.

The CPU 54 determines what messages are displayed or annunciated over the display or annunciation unit 62. The CPU 54 also identifies different road conditions from the sensors 60 and converts the road condition information into messages. The CPU 54 also determines which messages are stored and deleted in buffer 56 and transmitted from transmitter 52.

Figure 5:
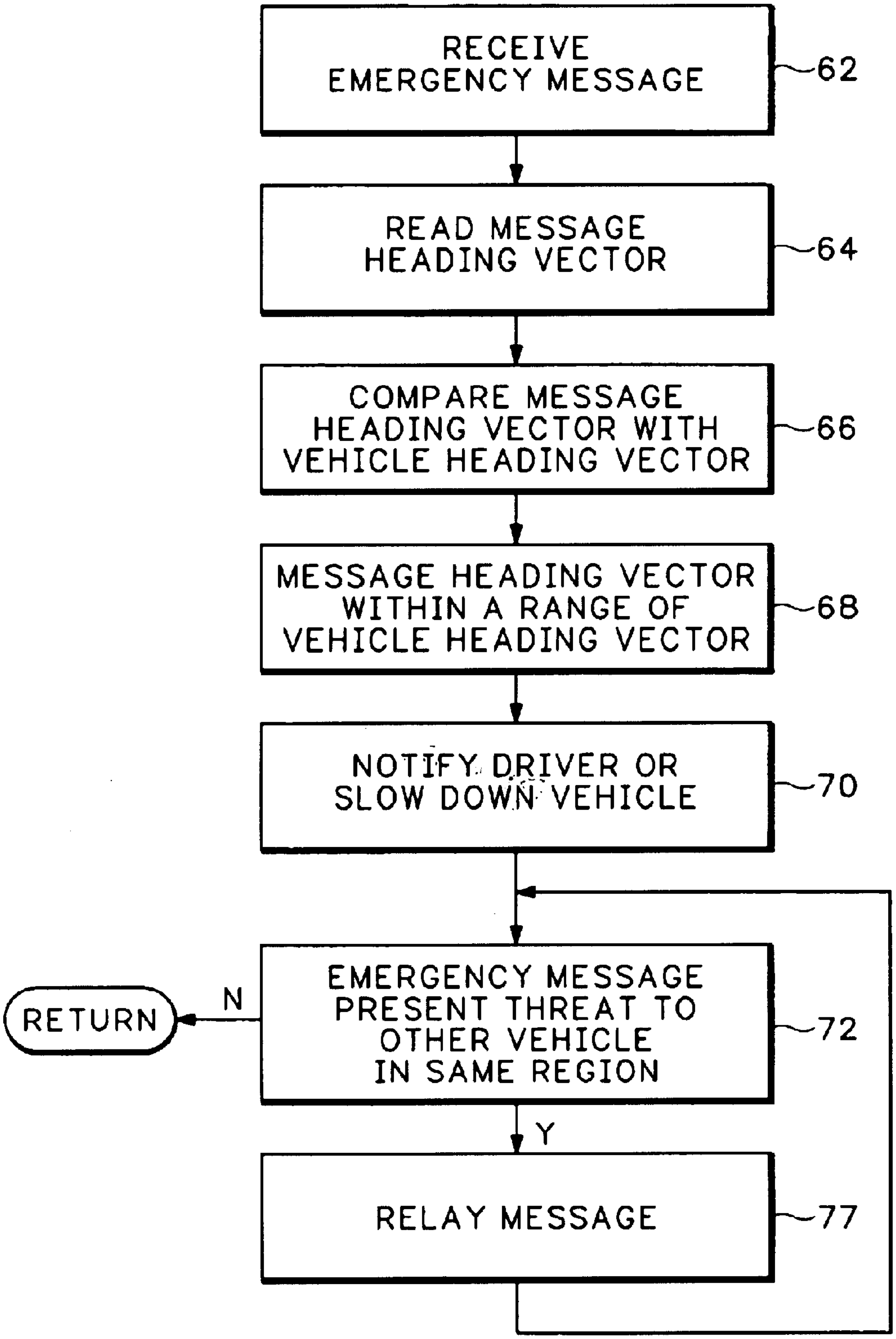
FIG. 5 is a flow diagram showing how messages are processed in different vehicles according to kinematic state information associated with the message.

FIG. 5 shows how the multi-vehicle communication system processes and relays messages according to geographic and kinematic state information. The example described below is used for notification of emergency situations, however, the system can be used for any type of messaging. An emergency message is received by a vehicle in block 62. One example of an emergency message may be a message from a police vehicle or an ambulance that it will be traveling along a particular roadway.

The emergency message contains kinematic state information relating to the current location and the direction of travel of the emergency vehicle. The emergency message may also include a route map indicating the intended course of travel for the emergency vehicle. The kinematic state may include position, velocity vector, acceleration vector, range, angle, and heading information. The kinematic state information is described in copending U.S. patent application Ser. No. 09/892,333, filed Jun. 26, 2001, entitled: METHOD AND APPARATUS FOR TRANSFERRING INFORMATION BETWEEN VEHICLES which is herein incorporated by reference.

Any vehicles receiving the emergency message in block 62 first reads a heading vector for the emergency message in block 64. The CPU in the vehicle receiving the message then compares the heading vector with its own heading vector in block 66. If the CPU in block 68 determines that the two heading vectors are in a same general region, or appear to be approaching the same region, a warning message is sent to the vehicle operator in block 70. In an alternative implementation, the CPU will automatically slow down and, if necessary, stop the vehicle if the heading vector comparison determines that the two vehicles are on a collision course.

In block 72, the CPU for the vehicle receiving the emergency message may or may not relay that emergency message to other vehicles. If the heading vector for the emergency vehicle is too far away from the vehicle receiving the message, the vehicle CPU may decide that the emergency message does not present a threat to itself or any other vehicles in the immediate area. In this situation, the emergency message may not be relayed to other vehicles. If the heading vector in the emergency message does present a possible threat, the CPU relays the emergency message in block 74 to any other vehicles in the same vicinity.

Map-based Message Relaying

Figure 6:
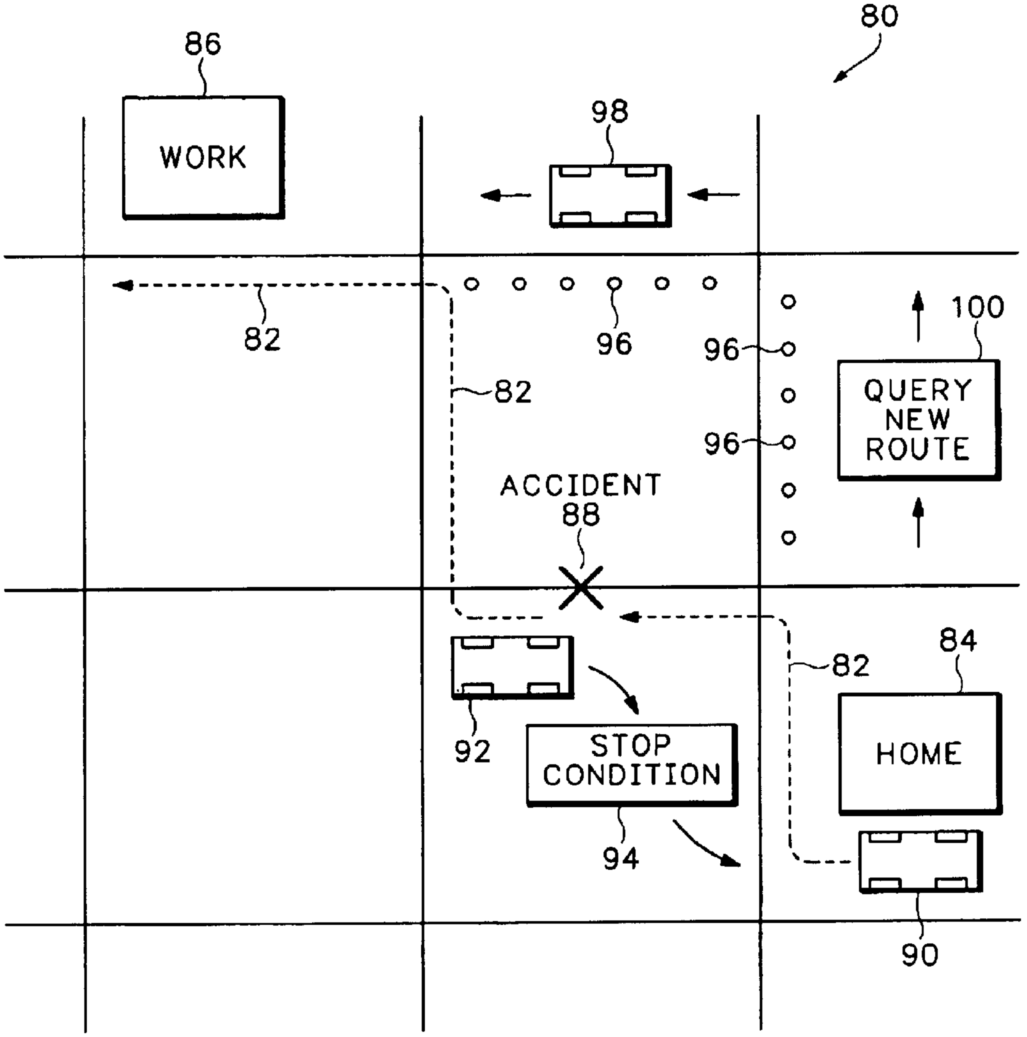
FIG. 6 is a diagram showing how map routes are automatically updated for different road conditions.

Referring to FIG. 6, most electronic maps lay out a most direct route 82 from one starting point 84 to a destination point 86. However, a real time event, such as an accident 88, may happen along path 82 that requires a vehicle 90 to take an alternate route.

Another vehicle 92 that is actually traveling along route 82 may detect the event 88 either using vision sensors that detect a collision or using speed and velocity sensors that detect vehicle 92 in a stop or slow down condition. The event detected by vehicle 92 is transmitted in a message 94 to vehicle 90.

Figure 7:
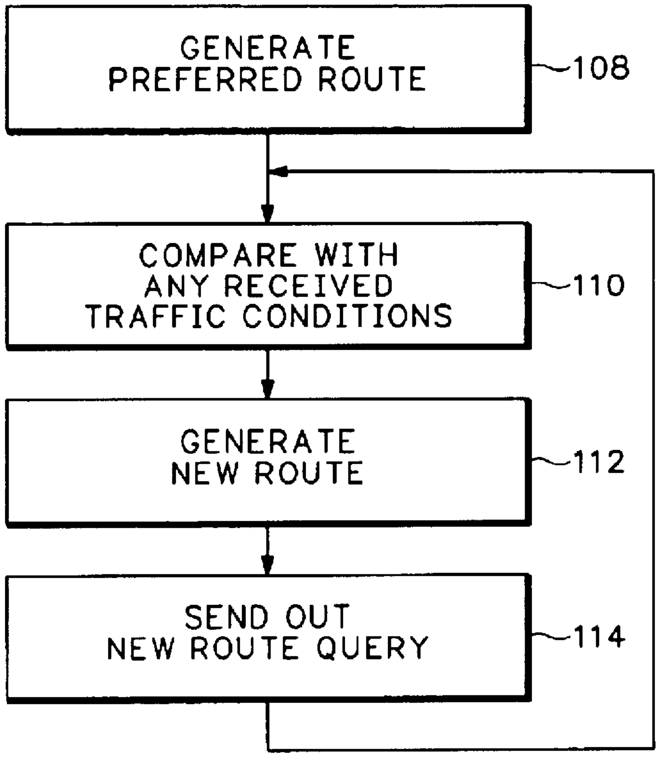
FIG. 7 is a flow diagram showing in more detail how map reroutes are automatically updated.

Referring to FIGS. 6 and 7, a navigation system 61 (FIG. 4) initially generates the preferred route 82 for vehicle 90 in block 108. The navigation system in block 110 compares the route with any messages, such as message 94, received from other vehicles. If the messages 94 indicate a traffic stoppage event 88 along the original route 82, the navigation system generates a new route 96 (FIG. 6) for vehicle 90 around the event 88 in block 112.

One report from stopped vehicle 92 may not be enough to cause the navigation system in vehicle 90 to generate a reroute 96. However, if the navigation system receives messages 94 from multiple vehicles, each identifying a traffic stoppage in the same general area around event 88, then the new route 96 is generated.

In another aspect of the map-based messaging system, the navigation system in vehicle 90 (FIG. 6) sends out a query 100 in block 114 for the original one for the new route 96. Any vehicles, such as vehicle 98 in FIG. 6, traveling along the route contained in query message 100 may respond. If there is no response to the query message 100, or the responses do not indicate a traffic stoppage event, the navigation system in vehicle 90 displays the new route 96 to the vehicle operator on a display screen.

Figure 8:
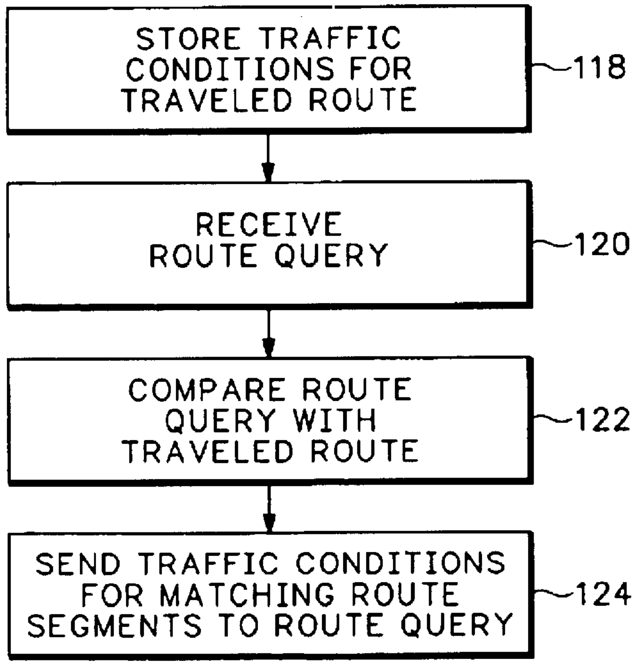
FIG. 8 is a flow diagram showing how route status is transmitted from a vehicle.

FIG. 8 shows how the vehicles traveling along a route store and relay route information. For example, vehicle 98 in FIG. 6 stores traffic events for traveled route 96 in block 118. The traffic events may include average speed of travel for the vehicle over some period of time or for a particular segment along path 96. The speed, direction and other sensor information from the vehicle is combined with global positioning information to generate the traffic. The vehicle 98 receives a route query in block 120.

The route query may include all or a subset of route segments for route 96. The route segments identified in the query 100 (FIG. 6) are compared in block 122 with the segments of route 96 that have actually been traveled by vehicle 98. If any of the segments are the same, the vehicle 98 transmits traffic events for those matching route segments in block 124. Any vehicles receiving the query request, but not having matching route segments, simply ignore the query request.

The vehicle 90 may receive responses back from multiple vehicles. The navigation system for vehicle 90 selects the best responses before selecting a route. For example, one response may indicate no traffic stoppage along route 82 and another response may indicate a traffic stoppage along route 82. The navigation system in vehicle 90 may generate a route based on the message with the most recent timestamp.

Alternatively, the navigation system in vehicle 90 may generate the route according to which responses cover a largest portion of the route identified in the query 100 (FIG. 6). In another implementation, the navigation system may receive many responses indicating a traffic stoppage and only one or two responses indicating no stoppage. In this situation, the navigation system generates a route based on the traffic condition that is reported most often by the vehicles traveling along the identified route.

Figure 9:
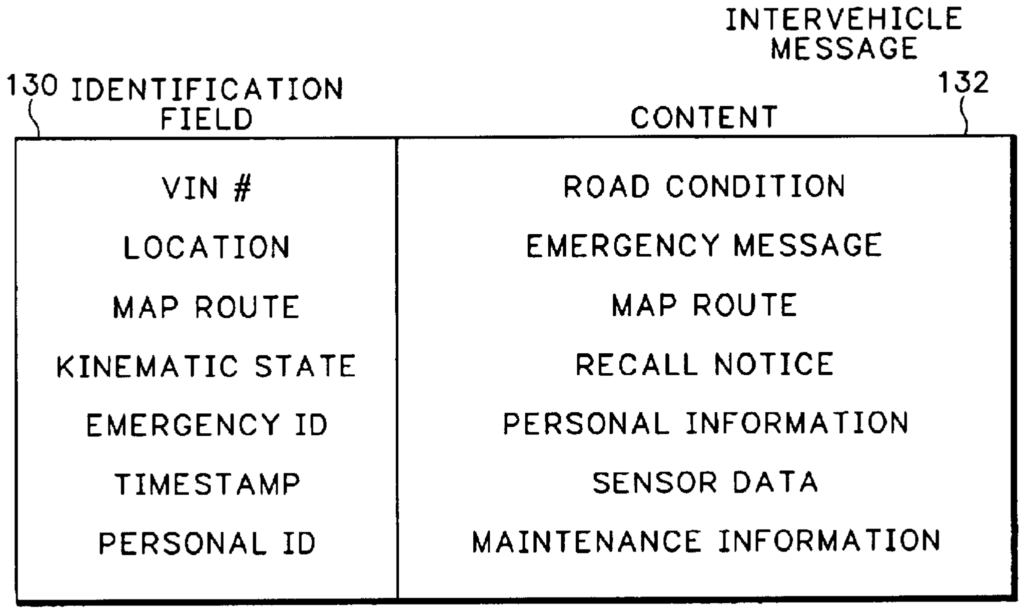
FIG. 9 is a diagram showing some of the information sent in inter-vehicle messages.

FIG. 9 shows some examples of the types of information that may be contained in the inter-vehicle messages. An identification field 130 contains some indicator of a type of message. The identification field 130 is used by the receiving vehicle to determine an appropriate action. Some examples may include a vehicle identification number, location information for a detected event, a map route for a vehicle, kinematic state information for a vehicle, an emergency identification number, a timestamp or a personal identification number that is associated with a particular vehicle or vehicle operator.

Content information 132 can include road conditions, emergency messaging, map routes, recall notices, sensor data, vehicle maintenance information, or personal information, such as a text message or audio message. Of course, any other type of information not listed above, can also be transmitted.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

What is claimed is:

1. A method for processing messages in a vehicle, comprising:

receiving a message containing a message identifier;

comparing the message identifier to an vehicle identifier;

processing the message according to the comparison between the message identifier and the vehicle identifier; and storing the message in memory located in the vehicle and periodically transmitting the stored message from the vehicle to other vehicles.

2. A method according to claim 1 including deleting the message from memory according to when the message was received in the vehicle.

3. A method for processing messages in a vehicle, comprising:

receiving a message containing a message identifier;

comparing the message identifier to an vehicle identifier;

processing the message according to the comparison between the message identifier and the vehicle identifier;

receiving emergency information in the message from an emergency vehicle;

identifying a route for the emergency vehicle from the message identifier;

identifying a route for the vehicle;

displaying the message to a vehicle operator according to a comparison of the emergency vehicle route and the vehicle route; and relaying the emergency information to other vehicles according to the comparison of the emergency vehicle route and the vehicle route.

4. A method for using an electronic map, comprising:

identifying an original route using the electronic map;

receiving messages identifying events associated with the original route;

identifying a new route according to the identified events; and receiving the messages from vehicles traveling along the original route.

5. A method according to claim 4 including:

sending out queries for events associated with the original route;

receiving messages identifying events associated with the original route; and selecting the new route according to the identified events for the original route.

6. A method according to claim 4 wherein the events include speed information or collision information from vehicles traveling along the original route.

7. A method according to claim 4 including:

receiving messages from different vehicles traveling over the original route; and selecting the new route according to the messages from the different vehicles most recently traveling the original route.

8. A method according to claim 4 including;

tracking a traveled route for the vehicle;

recording events associated with the traveled route receiving a route query from another vehicle containing a proposed route;

comparing the traveled route to the proposed route; and sending the recorded events to the vehicle sending the route query for segments of the traveled route matching the proposed route.

9. A vehicle communication system, comprising:

a receiver receiving messages containing events detected by other vehicles or portals;

a processor responding to the messages according to a message identifier; and a memory that stores the received messages, the processor periodically transmitting the stored messages to other vehicles.

10. A vehicle communication system according to claim 9 including deleting the stored messages according to available space in the memory and according to when the messages were received.

* * * * *